(12) United States Patent
Martinez De La Cruz et al.

(10) Patent No.: US 11,374,974 B2
(45) Date of Patent: Jun. 28, 2022

(54) SECURITY ENFORCEMENT FOR VIRTUAL GATEWAYS

(71) Applicant: Telefonaktiebolaget LM Ericsson (publ), Stockholm (SE)

(72) Inventors: Pablo Martinez De La Cruz, Madrid (ES); Maria Pilar Benito Diez, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 156 days.

(21) Appl. No.: 16/757,679

(22) PCT Filed: Nov. 15, 2017

(86) PCT No.: PCT/EP2017/079310
§ 371 (c)(1),
(2) Date: Apr. 20, 2020

(87) PCT Pub. No.: WO2019/076471
PCT Pub. Date: Apr. 25, 2019

(65) Prior Publication Data
US 2020/0336511 A1  Oct. 22, 2020

(30) Foreign Application Priority Data

Oct. 20, 2017 (EP) .................................... 17382702

(51) Int. Cl.
*H04L 45/02* (2022.01)
*H04L 45/64* (2022.01)
*H04L 9/40* (2022.01)

(52) U.S. Cl.
CPC ............ *H04L 63/166* (2013.01); *H04L 45/02* (2013.01); *H04L 45/64* (2013.01); *H04L 63/20* (2013.01)

(58) Field of Classification Search
CPC ....... H04L 45/02; H04L 45/64; H04L 63/166; H04L 63/20
See application file for complete search history.

(56) References Cited

U.S. PATENT DOCUMENTS 9,590,901 B2 * 3/2017 Tubaltsev ............. H04L 45/586
2006/0174035 A1 * 8/2006 Tufail ..................... H04L 45/02
709/239

(Continued)

FOREIGN PATENT DOCUMENTS

CN  107104896 A  8/2017
EP  2983333 A1  2/2016

(Continued)

OTHER PUBLICATIONS

International Search Report and the Written Opinion of the International Searching Authority, issued in corresponding International Application No. PCT/EP2017/079310, dated Sep. 27, 2018, 16 pages.

(Continued)

*Primary Examiner* — Alina A Boutah
(74) *Attorney, Agent, or Firm* — Rothwell, Figg, Ernst & Manbeck, P.C.

(57) ABSTRACT

A method for operating a flow control entity which is configured to control a data packet flow in a network in which at least one virtualized gateway and at least one other gateway exchange routing data is disclosed. The flow control entity receives a message from a node located in an interconnection used by the at least one virtualized gateway and the at least one other gateway to exchange routing data by which one the gateways informs the other of the gateways about new routes and withdrawn routes for data packet flows which traverse the at least one virtualized gateway and the at least one other gateway, extracts the routing data from the received message, translates the extracted routing data into (Continued)

routing information, and transmits the routing information to an infrastructure managing entity configured to manage a virtualized infrastructure of the network.

18 Claims, 13 Drawing Sheets

(56) References Cited

U.S. PATENT DOCUMENTS

| | | | | |
|---|---|---|---|---|
| 2015/0263946 A1* | 9/2015 | Tubaltsev | ............... | H04L 45/02 |
| | | | | 370/392 |
| 2015/0281054 A1* | 10/2015 | Utgikar | ................. | H04L 49/351 |
| | | | | 709/221 |
| 2016/0241457 A1* | 8/2016 | Semwal | .................. | H04L 45/02 |
| 2016/0261493 A1* | 9/2016 | Li | ........................... | H04L 43/50 |
| 2017/0041211 A1* | 2/2017 | Pandya | ................... | H04L 45/64 |
| 2018/0159790 A1* | 6/2018 | Wang | ................. | H04L 47/6215 |
| 2018/0287929 A1* | 10/2018 | Means | .................... | H04L 45/02 |

FOREIGN PATENT DOCUMENTS

| | | | | |
|---|---|---|---|---|
| WO | 2014035312 | A2 | 3/2014 | |
| WO | 2015173759 | A1 | 11/2015 | |
| WO | WO-2018020293 | A1 * | 2/2018 | ............. H04L 45/04 |

OTHER PUBLICATIONS

Ben-Itzhak, et al. "EnforSDN: Network Policies Enforcement with SDN" 2015 IFIP/IEEE International Symposium on Integrated Network Management (IM 2015), IEEE, May 11, 2015, pp. 80-88.

* cited by examiner

FIG. 7

| Match | Action |
|---|---|
| of_port=VGWA_NWA, direction=ingress, ip_src=route_in_NetworkA, ip_dst=route_in_NetworkB | goto=next_table |
| of_port=VGWA_NWA, direction=egress, ip_src=route_in_NetworkB, ip_dst=route_in_NetworkA | goto=next_table |
| of_port=VGWA_NWB, direction=ingress, ip_src=route_in_NetworkB, ip_dst=route_in_NetworkA | goto=next_table |
| of_port=VGWA_NWB, direction=egress, ip_src=route_in_NetworkA, ip_dst=route_in_NetworkB | goto=next_table |
| ... | ... |
| ANY | drop |

540

541: Tuple of entries for each route learnt from interface VGWA_NWA
542: Tuple of entries for each route learnt from interface VGWA_NWB Priority ←

| Match | Action |
|---|---|
| of_port=VGWA_NWA,<br>mac_dst=mac_VGWA_NWA<br>ip_dst=route_in_NetworkB | goto=next_table |
| of_port=VGWA_NWA<br>mac_src=mac_VGWA_NWA<br>ip_src=route_in_NetworkB | goto=next_table |
| of_port=VGWA_NWB<br>mac_dst=mac_VGWA_NWB<br>ip_dst=route_in_NetworkA | goto=next_table |
| of_port=VGWA_NWB<br>mac_src=mac_VGWA_NWB<br>ip_src=route_in_NetworkA | goto=next_table |
| ... | " |
| ANY | drop |

560

561 — Tuple of entries for each route learnt from interface VGWA_NWA

562 — Tuple of entries for each route learnt from interface VGWA_NWB

Priority ←

FIG. 8

SECURITY ENFORCEMENT FOR VIRTUAL GATEWAYS

CROSS REFERENCE TO RELATED APPLICATION(S)

This application is a 35 U.S.C. § 371 National Phase Entry Application from PCT/EP2017/079310, filed Nov. 15, 2017, designating the United States, and also claims the benefit of European Application No. 17382702.3, filed Oct. 20, 2017, the disclosures of which are incorporated herein by reference in their entirety.

TECHNICAL FIELD

The application relates to a method for operating a flow control entity which is configured to control a data packet flow in a network in which at least one virtualized gateway and at least one other gateway exchange routing data. Furthermore, the corresponding flow control entity is provided. Additionally, a computer program comprising program code to be executed by at least one processing unit of a flow control entity is provided and a carrier comprising the computer program.

BACKGROUND

Cloud Data Centers

Cloud data centers are data centers specialized in running virtualized workloads. As opposed to regular datacenters, in which workloads are run on dedicated baremetal servers for each application, cloud data centers use virtualization techniques to run several applications on the same baremetal servers.

Such techniques include:
- usage of hypervisors or containers to run applications.
- usage of virtual volumes to provide storage to applications
- usage of virtualized switches (vswitches) and software-defined networking controllers to manage the virtualized networking providing connectivity to the applications.

Network Function Virtualization (NFV)

Network Function Virtualization (NFV) refers to the deployment, execution, and operation of telecommunication network functions (such as packet gateways, control nodes, subscriber databases, or OSS/BSS systems) in virtualized environments, such as cloud data centers.

NFV decouples the physical hardware from the telecom network functions, allowing them to run in a wider set of hardware, and enabling collocation among them. Telecom network functions that run under this paradigm are said to be Virtualized Network Functions (VNFs).

Virtualized Infrastructure Manager (VIM)

In an NFV environment the Virtualized Infrastructure Manager (VIM) is a component of the Management and Orchestration framework (MANO) to manage the virtualized resources: compute, storage, and networks. Its main responsibilities are:
- Keeping an inventory of the allocation of virtual resources to physical ones
- Keeping a catalogue of virtual resources that can be associated to the VNFs
- Managing the virtual resources associated to VNFs
- Storing the images corresponding to the VNFs
- Providing performance and fault management for the managed resources OpenStack OpenStack is the leading open source VIM. It is composed by several projects and tools to handle the virtualized resources. The ones relevant for the purpose of this invention are listed below:
- Nova, to handle the lifecycle of the virtualized machines
- Glance, to store the images used for the workloads
- Horizon, to provide a graphical user interface to access, provision and control the lifecycle of the virtualized resources, creation of networks, instantiation/virtual machines,
- Neutron, to provide IP addresses to the workloads and networks where the VMs can be attached, allowing the connection between VMs and to external elements
- Heat, to orchestrate the deployment and life-cycle management of workloads, based on templates.

An OpenStack-based cloud typically have controller nodes, in which OpenStack services are run, and compute nodes, in which the tenant's workloads (i.e. VMs) are run.

Software Defined Networking (SDN), SDN Controllers, and SDN Switches

Software defined networking (SDN) is an approach for deploying, configuring and managing networks. As opposed to traditional networking, where forwarding and control logic is tightly coupled, software defined networking introduces abstractions to decouple the forwarding plane from the control plane. When decoupled in such way, the control plane determines the logic to be applied to traffic, and the data plane forwards the packets according to such logic. Control and data planes must communicate using some protocol.

The control plane management is centralized by the SDN controller. The forwarding plane is implemented by one or more SDN switches or forwarding elements, be they either physical or virtual (as in a Cloud data center).

OpenFlow is one of the communication protocols that can be used when realizing SDN, and runs between the SDN controller and the SDN switches. It enables an SDN controller to program the SDN switches' forwarding tables, and receiving events and reports from the SDN switches. Other communication protocols that can be used in the context of SDN include OVSDB, and Netconf.

An SDN switch or forwarding element has several flow tables comprising a pipeline. Every flow table has several flow entries. Every entry has a flow match filter and a set of instructions.

When packets arrive to the SDN switch, they traverse the flow tables across the pipeline. Each flow table is scanned for a flow match filter matching the packet. Matching criteria include L2/L3 (Layer 2/Layer 3) attributes (such as IP/MAC addresses, ports, protocols), ingress port, or other metadata. If a match occurs, the instructions associated to the corresponding flow entry are executed. If no match occurs, processing continues on the next flow table in the pipeline.

When a packet has traversed the pipeline, or when the flow instructions dictate so, the switch may send the packet though one or more ports.

Network applications are implemented in an SDN switch by provisioning the different flow tables in the pipeline according to the application logic. This programming is made by the SDN Controller, which is ultimately driven by the network application.

Examples of SDN controllers include OpenDaylight and OpenContrail. Examples of SDN switches include Open vSwitch.

Access Control Lists

Access Control Lists (ACLs), when applied to networking technology, provide rules that allow selective access to network resources, be they networks and subnetworks, network services, or network devices.

Network administrators use ACLs to enforce basic access control to network resources. ACLs usually operate on L2 or L3 parameters, such as the five-tuple. ACLs are often deployed in networking equipment, such as switches and routers or gateways, although may also be deployed on clients and servers. A typical ACL usage is to allow traffic over a network or a subnetwork only if traffic comes from or goes to a given list of networks or hosts. The definition and provisioning of ACLs, their implementation, and capabilities vary among devices and vendors.

It is also common to complement ACLs with more robust security mechanisms, such as traffic inspection or firewalls, to provide enhanced security. Such mechanisms are typically used to allow traffic for a given network service, or network protocol only. The industry provides a wide set of options from different vendors.

In OpenStack, ACLs are implemented by two complementary techniques: security groups and port security rules. OpenStack also provides infrastructure support for firewall-like functionality with the Firewall as a Service (FWaaS).

Security Groups

A Security group is a container for security rules that are used to limit the types of traffic sent or received by VMs. A security rule defines the type of traffic and direction (ingress/egress) that can pass through a virtual interface of a VM. In this way rules for allowing traffic towards and from workloads are established. The security group term is particular to OpenStack, although equivalent concepts exist in other VIMs.

Security groups can be applied globally to all interfaces of a VM, or can be set individually to ports of the VM, allowing a finer grain in the security policies for the VMs.

Security rules can be expressed in terms of IP protocol (TCP, UDP, ICMP), ports or services (such as 80 for HTTP, 22 for SSH), and direction of the traffic (ingress or egress to the VM). It is also possible to use individual IP addresses, IP address ranges (CIDR), or source groups, that is, a group of VMs belonging to a given security group.

Provisioning of security groups is done by dedicated northbound APIs that are consumed by GUIs or command-line clients. It is possible to assign several security groups to a VM or to a VM network interface. Security rules of all security groups are combined and enforced by the data plane. Packets matching a security rule are allowed to reach or leave the VM, and packets not matching any security rule are dropped.

Security group enforcement can be disabled VIM-wide. In OpenStack deployments, when security groups functionality is enabled, there is a "default" security group defined for each VM, with the following behavior: all egress traffic and intercommunication in the "default" group are allowed and all ingress from outside of the default group is dropped by default.

Port Security

Port security settings prevent a VM from sending packets whose source IP and MAC address does not match the ones of the interface the packet is sent over. Analogously, port security settings also prevent a VM from receiving packets whose destination IP and MAC address does not match the ones of the interface the packet is received on.

The reason for these settings, enabled by default, is to increase the virtualized networking security by:

avoiding anti-spoofing, that is to prevent a potential attacker VM to inject traffic in the virtualized network impersonating other VM.

avoiding traffic sniffing/eavesdropping by potentially malicious VMs, using promiscuous mode settings in the virtual interface to capture all traffic in the network, including the one not intended to the VM itself.

Port security rules are applied to all of the VM virtual network interfaces/ports by default, filtering any traffic from/to VMs against the port IP/MAC address and any other IP/MAC addresses specified in the allowed-address-pair port attribute. The allowed-address-pair attribute permits to specify IP/MAC addresses (CIDR) pairs that are allowed to pass through a port. This enables the use of protocols such as VRRP, which floats an IP address between two instances to enable fast data plane failover.

The default behavior for port security rules is:
to allow ingress traffic on a port, if the destination MAC and the destination IP are those of the MAC and IP address of the port.
To allow egress traffic if the source MAC and source IP addresses are those of the MAC and IP addresses of the port.

Gateways

A gateway is a network node that allows the communications between two or more different networks, usually with different protocols. These gateways may be implemented as a combination of hardware and software or just as software (as a VNF). As these nodes are usually located at the edges of the networks, it is common for the gateways to include additional capabilities or features, such as firewalling, or intrusion detection systems (IDS).

Usually VRF (Virtual Routing and Forwarding) techniques are included in gateways for allowing several instances of a routing table to coexist simultaneously. Each VRF works like a logical router, with its own routing and forwarding tables and its own routing protocol. Traffic that is managed inside a VRF is effectively isolated from traffic managed by another VRF.

BGP

Border Gateway Protocol (BGP) is an interdomain routing protocol designed to provide loop-free routing between separate routing domains that contain independent routing policies (Autonomous Systems). BGP is the protocol used on Internet, to exchange routes between different ISPs.

BGP is a connection oriented protocol, running over TCP on port 179. As opposed to interior gateway protocols, such OSPF or RIP, it does not try to find the shortest path, but it takes routing decision based on paths, networks policies or rules introduced by the network administrators. It is a path vector protocol, where a route is defined as a collection of several Autonomous System (AS) numbers that it passes through from source AS to destination AS. This list of AS numbers is called AS path and used to avoid routing loop. A BGP IP table inside a BGP-enabled gateway shows, for each network, the next hop to reach the network and the path, composed as a list of AS numbers, identifying the different autonomous systems that are needed to go through to reach the network.

Related to the general operation of a BGP node, it usually learns multiple paths via internal (inside the same Autonomous System) and external BGP speakers. It selects the best path, applying policies defined by the operator to influence the best path selection, and installs it in the routing table. Later this best path is announced to external BGP neighbors.

An example of the communication between two BGP gateways can be found in FIG. 1. FIG. 1 shows two gateways 30, 35, Gateway A and Gateway B, connected over a network, Network X. Both gateways configured to run a BGP session between them, via their respective BGP speakers 31, 36.

Gateway 30 is connected to two additional networks, Network A and Network B. From each of these networks, it is receiving network route announcements from other BGP peers (not depicted).

Analogously, Gateway 35 is connected to two additional networks, Network C and Network D, from which is also receiving route announcements.

Gateway 30 announces routes received from Networks A and B to Gateway 35, via its BGP speaker 31. Gateway 35 can learn such routes. This enables traffic arriving at Gateway 35 targeting networks accessible from Network A and B to be routed towards Gateway 30.

In turn, Gateway 35 announces routes received from Networks C and D to Gateway 30, via its BGP speaker 36. Gateway 30 can learn such routes. This enables traffic arriving at Gateway 30 targeting networks accessible from Network C and D to be routed towards Gateway 35.

When BGP peers belong to different ASs, it is referred to as external BGP (eBGP).

Conversely, when BGP peers belong to the same AS, it is referred to as internal BGP (iBGP).

VNFs deployed in a cloud datacenter must mandatorily adhere to the virtualized infrastructure requirements and policies set by the infrastructure service provider. This includes security requirements and policies.

One common security policy set by the service provider is to enforce access control on the network interfaces of the VNFs by deploying ACLs. Most VIMs provide mechanisms to do such enforcement. As already mentioned above, in the case of Openstack, ACLs are enforced by deploying security groups and port security rules.

Security Groups

Gateways run BGP to exchange routing announcements, so that all their peers can update their routing tables to enable proper routing as network routes are discovered. This means that a gateway may require sending traffic to, and receiving traffic from different networks dynamically over time.

Such dynamicity introduces a problem in the deployment of security groups and port security policies. As described above, security groups operate on individual IP addresses or IP ranges (CIDR), or source groups.

If source groups are used, all the traffic between two gateways in the same group is allowed to pass through, which in practice means that no access control is made at all.

If individual IP or CIDR addresses are used, it is required to have an alignment between the traffic that the gateway may send or receive at any time (as per the routes announced), and the IP or CIDR address ranges provisioned in the corresponding security group rules.

It is possible to deploy security groups whose rules only filter by protocol (i.e. TCP/UDP/ICMP) or port ranges (i.e. only HTTP/FTP traffic) only, and not by IP address ranges, but such rules are not practical for the purpose of deploying a gateway, which is supposed to manage any kind of traffic and protocol.

It is also possible to deploy security groups with rules operating on less restrictive IP ranges (for instance, by using coarse-grained routing prefix aggregation). This, however, potentially allows having unwanted traffic passing through the gateway if the granularity is too low.

A final alternative is not to deploy security groups at all, which is unacceptable for security reasons.

Security Rules

As described above, port security rules control which traffic can be originated in a VM interface, by default constrained to the IP address(es) assigned to the interface itself; and which traffic can pass through a VM interface, by default the traffic with destination the MAC/IP address(es) assigned to the interface itself. This is not the case in a gateway: when forwarding packets from other networks, at ingress, the packet's destination IP address will very likely not be the one of the interface the packet is received on; and on egress, the packet's source IP address will very likely not be the one of the interface the packet is sent over.

Accordingly, it is necessary to align the port security rules with the traffic that the gateway may send or receive at any time.

SUMMARY

Accordingly, a need exists to be able to update a virtualized gateway about new routes and withdrawn routes in the network in which the virtualized gateway is located.

This need is met by the features of the independent claims. Further aspects are described in the dependent claims.

According to a first aspect, a method is provided for operating a flow control entity which is configured to control a data packet flow in a network in which at least one virtualized gateway and at least one other gateway exchange routing data. The method comprises the step of receiving a message from a node located in an interconnection used by the at least one virtualized gateway and the at least one other gateway to exchange routing data by which one of the gateways informs the other of the gateways about new routes and withdrawn routes for the data packet flows which traverse the at least one virtualized gateway or the at least one other gateway. Furthermore, the routing data are extracted from the received message wherein the extracted information comprises at least information about the new routes and the withdrawn routes traversing the at least one virtualized gateway or the at least one other gateway. Furthermore, the extracted routing data are translated into routing information used to control the data packet flows at the at least one virtualized gateway. The routing information is then transmitted to an infrastructure managing entity which is configured to manage a virtualized infrastructure of the network.

With the above described method it is possible to keep a virtualized gateway up to date as far as the new routes and withdrawn routes for the data packet flows are concerned. With the translation of the extracted routing data from the received message, the routing information which is used to control the data packet flows at the virtualized gateway can be generated and the infrastructure managing entity can be informed accordingly. The infrastructure manager can then use the received routing data and can inter alia update security groups and/or port security rules of a switch which implements the switching of the data traffic for the gateway.

Furthermore, the corresponding flow control entity comprising a memory and at least one processing unit is provided wherein the memory comprises instructions executable by the at least one processing unit. The flow control entity controls the data packet flow in the network in which the at least one virtualized gateway when at least one other gateway exchange the routing data within the flow control entity is operative to operate as mentioned above or as discussed in further detail below.

As an alternative a flow control entity is provided comprising a first module configured to receive the message from the node located in the interconnection used by the at least one virtualized gateway and the at least one other gateway to exchange routing data by which one of the gateways informs the other of the gateways about new routes and withdrawn routes for the data packet flows which traverse the at least one virtualized gateway or the at least one other gateway. The flow control entity can comprise a second module configured to extract the routing data from the received message, wherein the extracted information comprises at least the information about the new routes and the withdrawn routes traversing the at least one virtualized gateway or the at least one other gateway. The flow control entity comprises a third module configured to translate the extracted routing data into routing information such as security groups and security rules, and the flow control entity comprises a fourth module configured to transmit the routing information to an infrastructure managing entity configured to manage a virtualized infrastructure of the network.

Furthermore, a method for operating a flow control entity is provided which is configured to control a data packet flow in a network in which at least one virtualized gateway and at least one other gateway exchange routing data by which one of the gateways informs the other of the gateways about new routes and withdrawn routes for the data packet flows which traverse the at least one virtualized gateway or the at least one other gateway. The method comprises the step of receiving a request for a configuration of a node located in an interconnection used by the at least one virtualized gateway and the at least one other gateway to exchange the routing data. Furthermore, a configuration of the node located in the interconnection is determined such that the node is configured to identify messages including the routing data exchanged between the at least one virtualized gateway and the at least other gateway and to transmit a copy of the message including the routing data to the flow control entity. Furthermore, the configuration is applied to the node located in the interconnection.

In this method, the flow control entity controls the node, by way of example a forwarding entity of flow switching node such that this node identifies when information about new routes or withdrawn routes are exchanged between the gateways. The flow control entity configures the node such that when it has identified such a message including routing data, a copy of the message is transmitted to the flow control entity so that the flow control entity can then, as discussed above translate the extracted routing data into routing information which is then transmitted to the infrastructure managing entity of the virtualized infrastructure.

Furthermore, the corresponding flow control entity is provided configured to operate as mentioned above to configure the node located in the interconnection between the gateways.

As an alternative, a flow control entity is provided which is configured to control the data packet flow in a network in which the at least one virtualized gateway and at least one other gateway exchange routing data by which one of the gateways informs the other of the gateways about new routes and withdrawn routes for the data packet flows which traverse at least one of the virtualized gateway and the at least one other gateway. The flow control entity comprises a first module configured to receive the request for a configuration of the node located in the interconnection which is used by the two gateways to exchange the routing data. Furthermore, a second module is provided configured to determine the configuration of the node located in the interconnection such that the node identifies the messages including the routing data exchanged between the gateways and that the node transmits a copy of the message including the routing data to the flow control entity. Furthermore, a third module is provided which applies the configuration at the node located in the interconnection as determined.

It is to be understood, that the features mentioned above and features yet to be explained below can be used not only in the respective combinations indicated, but also in other combinations or in isolation without departing from the scope of the present invention. Features of the above mentioned aspects and embodiments as discussed below may be combined with each other in other embodiments unless explicitly mentioned otherwise.

BRIEF DESCRIPTION OF THE DRAWINGS

The foregoing and additional features and effects of the application will become apparent from the following detailed description when read in conjunction with the accompanying drawings in which like reference numerals refer to like elements.

FIG. 7 shows a further aspect of the pipeline shown in FIG. 6.

FIG. 8 shows still another aspect of the pipeline shown in FIG. 6.

DETAILED DESCRIPTION

Figure 1:
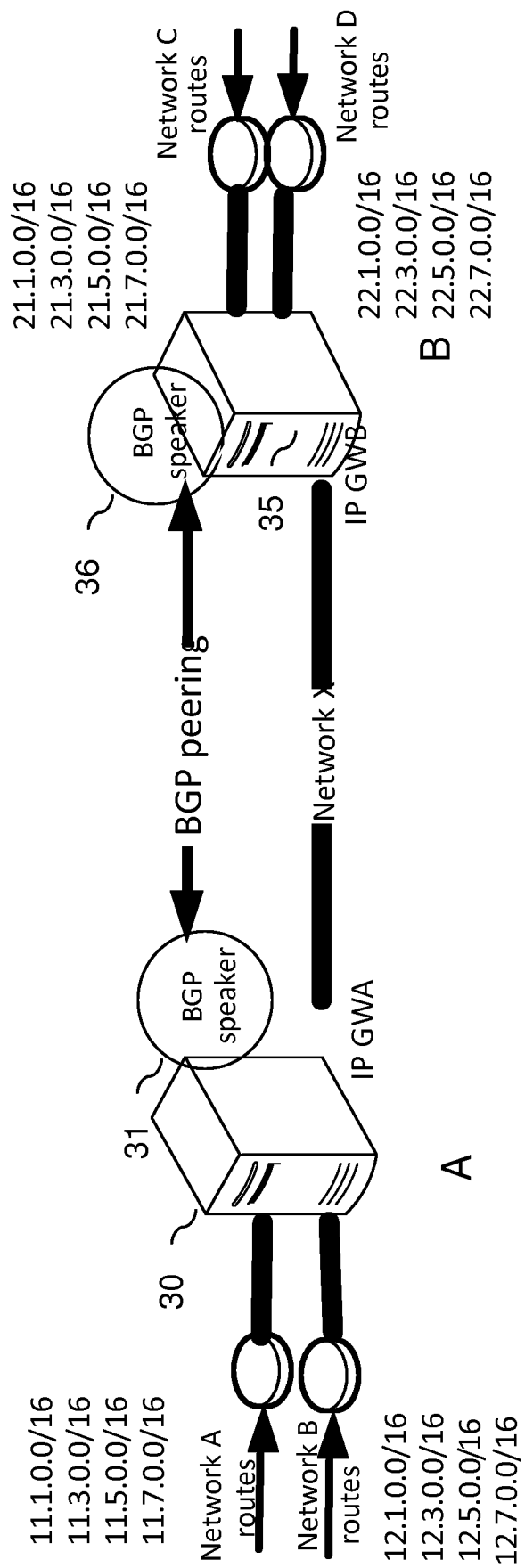
FIG. 1 shows a schematic overview of part of a network in which two gateways exchange information about new routes and withdrawn routes as known in the art.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are to be illustrative only.

The drawings are to be regarded as being schematic representations and elements illustrated in the drawings are not necessarily shown to scale. Rather, the various elements are represented such that their function and general-purpose becomes apparent to a skilled person. Any connection or coupling between functional blocks, devices, components or physical or functional units shown in the drawings and described hereinafter may be implemented by an indirect connection or coupling. The connection or coupling between components may be established over a wired or wireless connection. Functional blocks may be implemented in hardware, software, firmware, or a combination thereof.

As defined below a flow control entity such as an SDN controller programs the pipelines in one or more nodes such as switching entities, by way of example a cloud DC switch, in such a way that this node located in the interconnection between the gateways captures the routing data exchanged between the gateways and sends it to the flow control entity. The flow control entity then decodes the messages and extracts information regarding new and withdrawn routes. Furthermore, the flow control entity requests the virtualized infrastructure managing entity, to update the security groups and port security rules for the gateways, enabling the traffic for the connected routes to pass through them. The messages exchanged between the gateways may be BGP messages, however, other messaging protocols as may be used such as RIP (Routing Information Protocol), OSPF (Open Shortest Path First) IS-IS (Intermediate System to Intermediate System).

Figure 2:
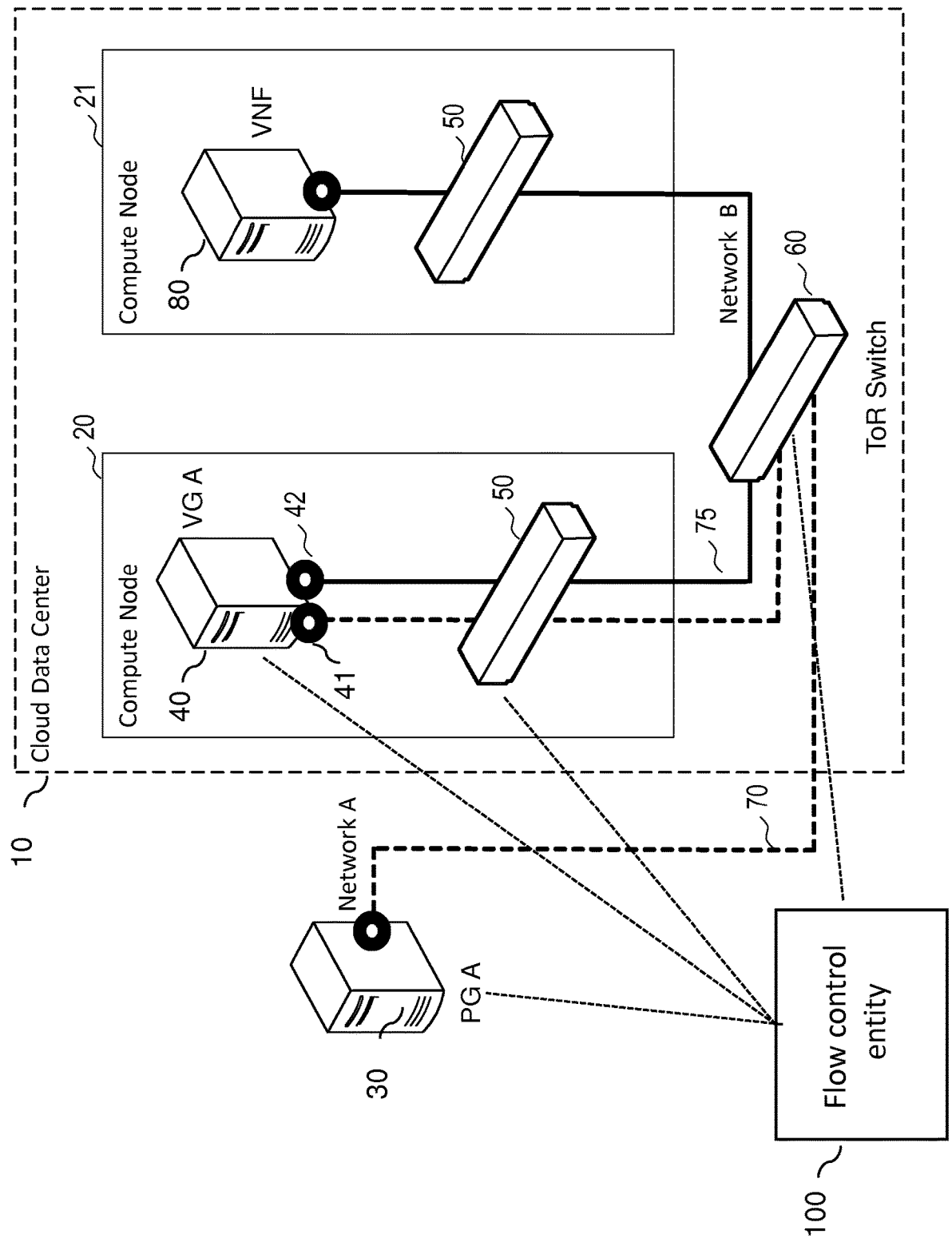
FIG. 2 shows a schematic architectural view of a network in which a flow control entity is configured such that it is informed about changed routes so that a switch for a gateway can be controlled in accordance with the new or withdrawn routes.

FIG. 2 illustrates a high-level architecture where the present invention can be applied. In FIG. 2, a cloud datacenter 10 is shown in which for the sake of clarity only two compute nodes 20, 21 are located. Other compute nodes or control entities have been removed for the sake of clarity. The first compute node 20 implements a virtual gateway 40, wherein this virtual machine named virtual Gateway A represents a gateway running as a virtual network function. A gateway virtual network function may comprise several virtual machines which are not depicted. Virtual machine named VNF represents a generic VNF such as an application server. In the example shown the virtual gateway 40 connects two networks, namely network 70 indicated in dashed lines and mentioned as network A and network 75 indicated in solid lines also named as network B. For network 70 the virtual gateway 40 has a dedicated virtual network interface or port 41 named VGWA_NWA. In the same way for network 75 the Gateway 40 has a dedicated virtual network interface or port 42 named VGWA_NWB. Both ports are connected to a virtual switch 50 running on the compute node. A switch 60, e.g. a switch in a hierarchy of network switches, i.e. in a leaf-and-spine topology, is used to connect all the compute nodes. Network B connects the virtual Gateway 40 to a VNF 80 in which a virtual switch 50 is located. Switch 60 is used to connect all the compute nodes including the machines running in them and a physical gateway 30 together, wherein the latter gateway could act as datacenter gateway providing connectivity between the cloud datacenter 10 and the external world. The virtual switches 50 in the different compute nodes 20 and 21 are connected via switch 60 using some underlay technology, such as VxLAN tunnels or VLANs that provide the necessary virtual network isolation.

FIG. 2 furthermore shows a central control entity 100 which controls the data packet flows at least in network A. In the following the central control entity is implemented as SDN controller, however, other implementations may be possible. Any entity capable of programming a set of switches can be used, e.g. an OpenDaylight, an OpenContrail or Openstack Neutron implementation.

Figure 3:
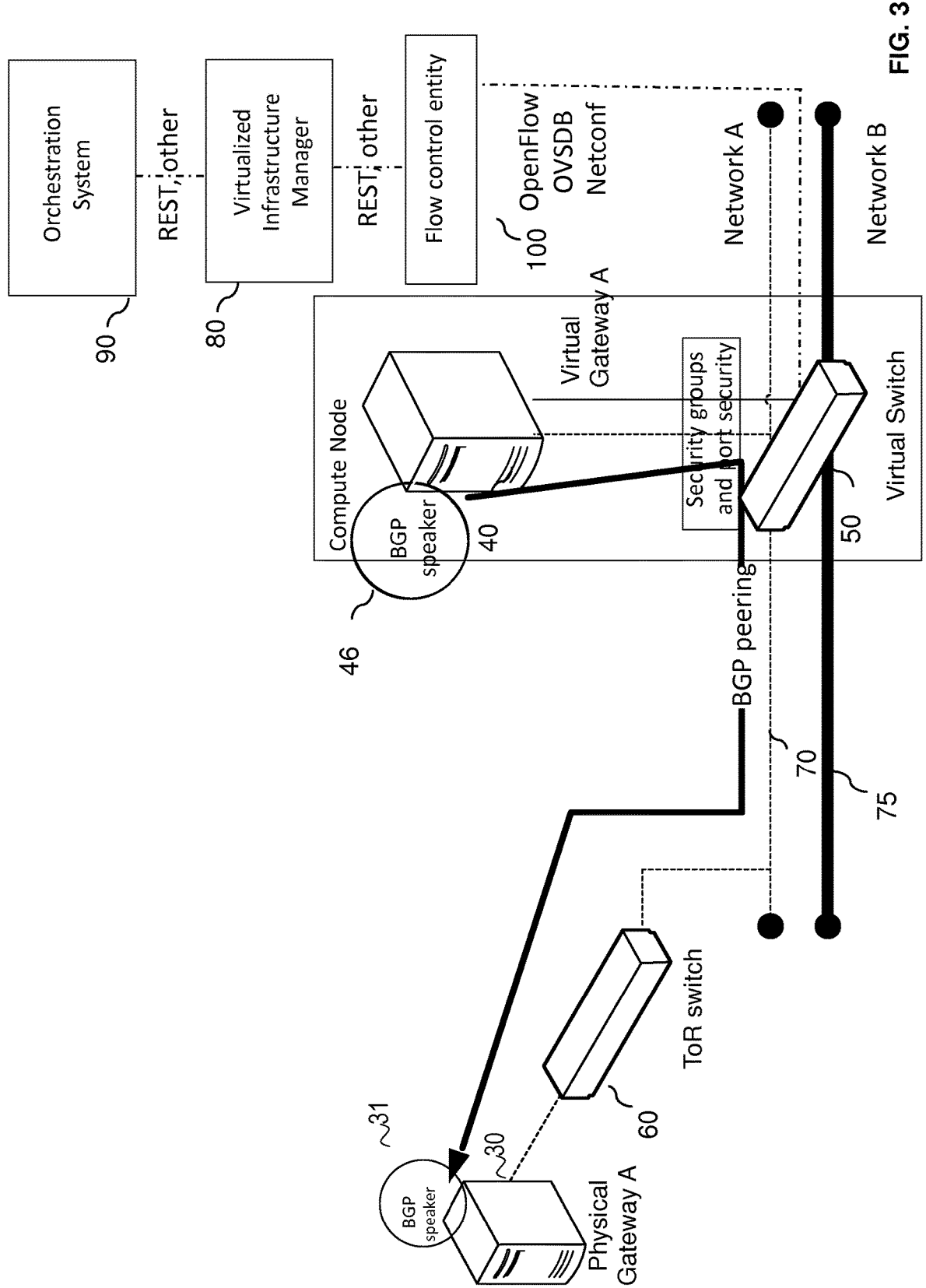
FIG. 3 shows a more detailed view of the system of FIG. 2.

FIG. 3 is a more detailed view of FIG. 2 and shows a BGP session between Physical Gateway 30 and Virtual Gateway 40 via its BGP speakers 31, 46. This communication may be carried out-of-band over dedicated control networks, not depicted in the figure for simplicity, or, as depicted, in-band using existing data plane networks, such as Network 70. It is also assumed that the Physical Gateway 30 and Virtual Gateway 40 are directly connected, that is, the data interfaces of each gateway belong to the same data network segment (and therefore there is no routing required between them), as it is the case of peers in eBGP.

The vswitch 50 implements an OpenFlow pipeline that among other network services, deals with the security groups and port security enforcement for data plane traffic. The BGP traffic is subject to enforcement also.

The vswitch 50 is connected to the flow control entity which programs the pipeline, using one or more of the possible control plane protocols, such as OpenFlow, OVSDB, or Netconf.

A VIM 80 (Virtualized Infrastructure Manager) interacts with the flow control entity to manage the virtual networking configuration, including the security groups and port security configuration. This communication is carried over interfaces based on REST or any other protocol.

In turn, an Orchestration System 90 orchestrates the deployment and life-cycle management of the VNFs and other Cloud data center elements, by interacting with the VIM 80 via interfaces based on REST or any other protocol.

Figure 4:
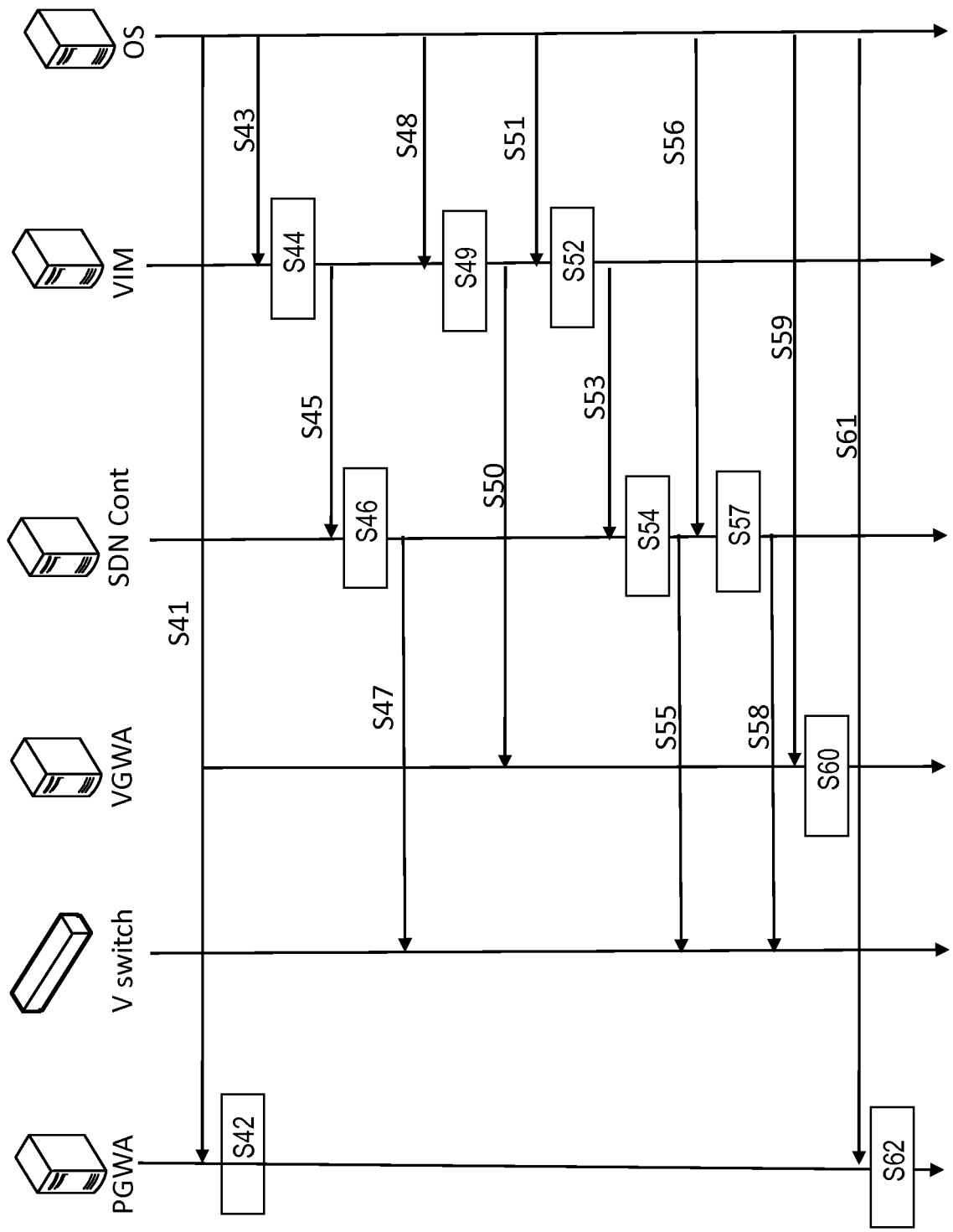
FIG. 4 shows a message exchange between some of the involved entities when a virtual switch located in the interconnection between two gateways should be configured such that a flow control entity is informed about any changes in the routes for the data packet flows.
Figure 5:
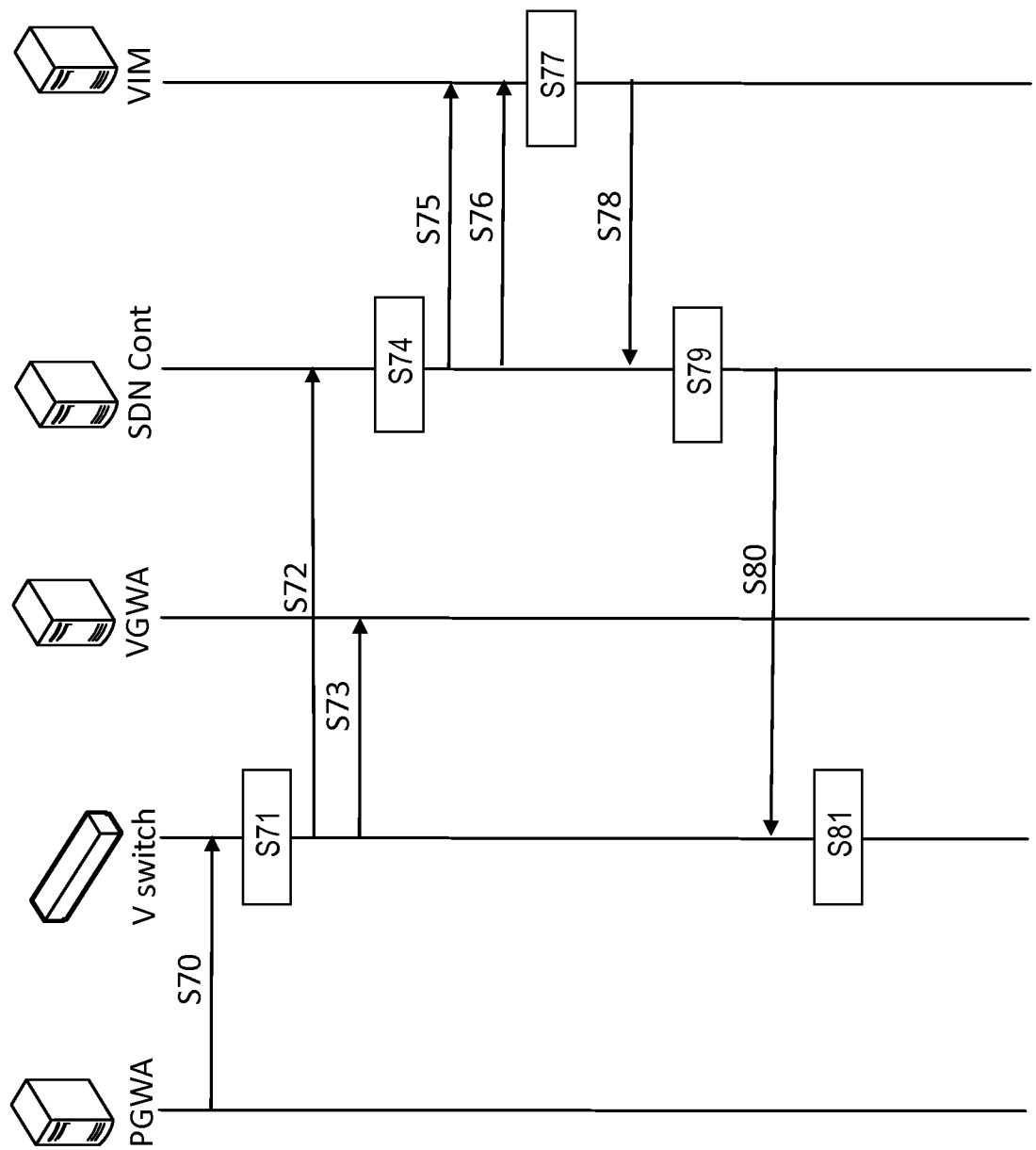
FIG. 5 shows a message exchanged between some of the involved entities in which the virtual switch is configured as shown in connection with FIG. 4, so that the flow control entity is informed about any changes in the routes for the data packet flows.

The invention is hereby explained in detail with two different signaling flows:
 a first signaling flow to illustrate the provisioning required to deploy two gateways in the cloud data center and to enable the BGP peering processing in the data plane as shown in FIG. 4.
 a second signaling flow to illustrate the data plane traffic processing for BGP traffic between the two gateways as shown in FIG. 5.

Gateways and Enabling of the BGP Peering Processing

It is assumed that a Service Provider has the Physical Gateway A 30 (from now on, PGWA) already deployed and configured, and wants to deploy the Virtual Gateway A 40 (from now on, VGWA), and enable BGP peering between them.

The required provisioning is illustrated with the help of FIG. 4.

FIG. 4 shows the flow for provisioning of the gateways and enabling of the BGP peering processing.

The Service Provider uses the Orchestration System 90 (OS) to orchestrate the deployment and configuration of the above.

The OS 90 starts by configuring the PGWA in step S41 to setup the corresponding VRF, and the BGP speaker. The protocol used can be, but not limited to, Netconf. In this case, it is assumed that the OS 90 does the provisioning, but it is also possible that the VIM 80 may do such provisioning on behalf of the OS 90, provided that the VIM 80 has the required capabilities to do so. If the BGP session is to be carried out-of-band over a dedicated network, the OS 90 indicates the networks and/or network interfaces to use for it.

The PGWA receives the configuration, and sets up the VRF and the BGP speaker accordingly (Step S42).

Then the OS 90 configures the virtual networking in the VIM (S43) to create the connectivity underlay to PGWA. The VIM 80 determines the required underlay configuration (S44) and requests the SDN controller to configure the virtual networking accordingly (S45). The SDN controller realizes the virtualized networking configuration by determining the configuration to be applied to the vswitch (S46). The SDN controller applies the configuration to the vswitch (S47) using control plane protocols such as OpenFlow, OVSDB, and Netconf as needed.

The OS 90 instantiates the VGWA by sending a command to the VIM (S48). The VIM 80 determines the VM images to use and allocates the virtual resources needed (S49), then instantiates the VGWA VM images and does the required bootstrapping (S50). Next, the OS 90 configures the virtual networking in the VIM (S51) to create the connectivity underlay to VGWA. The VIM 80 determines the required underlay configuration (S52) and requests the SDN controller to configure the virtual networking accordingly (S53). The SDN controller realizes the virtualized networking configuration by determining the configuration to be applied to the vswitch (S54). The SDN controller applies the configuration to the vswitch (S55) using control plane protocols such as OpenFlow, OVSDB, and Netconf as needed.

The OS 90 requests the configuration of the BGP peering to the SDN controller (S56). Optionally, the OS 90 shall call the VIM 80 first, and then the VIM in turn call the SDN controller, if the VIM supports the such capability. If the BGP session is to be carried out-of-band over a dedicated control plane network, the OS indicates the networks and/or network interfaces to use for the BGP speakers, and the binding information between the BGP control plane and data plane networks. The SDN controller determines the configuration to be applied to the vswitch (S57) to manage the BGP peering (in this example, VGWA and PGWA). The SDN controller applies the configuration to the vswitch (S58) using control plane protocols such as OpenFlow, OVSDB, and Netconf as needed.

Lastly the OS configures the BGP peering between the VGWA and the PGWA. The BGP session may be run in-band or out-of-band. To do so, it first sends a request to VGWA (S59) indicating the BGP peering details of PGWA. VGWA uses the information to configure its BGP speaker and set up the BGP session with PGWA (S60). Then, the OS sends a request to PGWA (S61) indicating the BGP peering details of VGWA. PGWA uses the information to configure its BGP speaker and set up the BGP session with VGWA (S62). At this moment, the BGP session between PGWA and VGWA is established.

In the following, dataplane traffic processing for BGP traffic is explained in more detail in connection with FIG. 5.

It is assumed that PGWA and VGWA have been deployed and provisioned as per the previous section discussed in FIG. 4.

For the dataplane to work, as the learning and withdrawal of routes over BGP occur, security groups and port security for PGWA and VGWA should be updated.

FIG. 5 illustrates an example of how the dataplane is configured to reflect the routes learnt by PGWA and VGWA over BGP.

PGWA 30 needs to announce new and withdrawn routes made available to it to VGWA 40. To do so, its BGP speaker sends a BGP Update message (S70) over the established BGP peering session to the BGP speaker of VGWA. The message arrives at a vswitch (likely the one that VGWA is connected to, but not necessarily that one). The vswitch executes its OpenFlow pipeline (S71) and it determines that it should send the packet to the controller (S72) by using a Packet-in OpenFlow message, and forward the data packet to the VGWA (S73). One of the potential realizations of the Openflow pipeline to support this behavior is further described in further detail below under the "OpenFlow pipeline" section.

The SDN controller, upon reception of the packet, processes it (S74) and attempts extracting a BGP message from it. If a BGP message is successfully extracted, and the message is a BGP Update message, it extracts the new routes contained in it, and the withdrawn routes. For both new and withdrawn routes, it creates a security group update request and sends it to the VIM (S75), and a port security update request, that is sent also to the VIM (S76). Steps S74 to S76 are further described below under the "BGP processing in controller" section.

The VIM receives the security group and port security update requests and processes them (S77). The processing potentially includes the validation of the operation, the update of its data model, and the identification of changes to be performed. The VIM then sends one or more requests to the SDN controller for the different changes to be performed to security group and port security elements (S78).

Upon reception of the requests, the SDN controller processes them (S79) and determines the required changes in the pipeline. Then it builds the required rules to be sent to the vswitch and sends them to it using OpenFlow messages (S80). Steps S79 and S80 are further described in this invention under the "OpenFlow pipeline update in controller" section.

The vswitch install the received rules (S81). At this point, packets coming from or going to routes learn by the BGP update message in S70 can reach both gateways as the security groups and port security rules just installed will allow for it.

OpenFlow Pipeline

The OpenFlow pipeline of the vswitch 50 may contain a varying number of tables depending on the number of network applications and services that the SDN controller has programmed on it. Also, depending on the SDN controller used, the number, ordering, and logic implemented in the different tables of the pipeline may vary.

Figure 6:
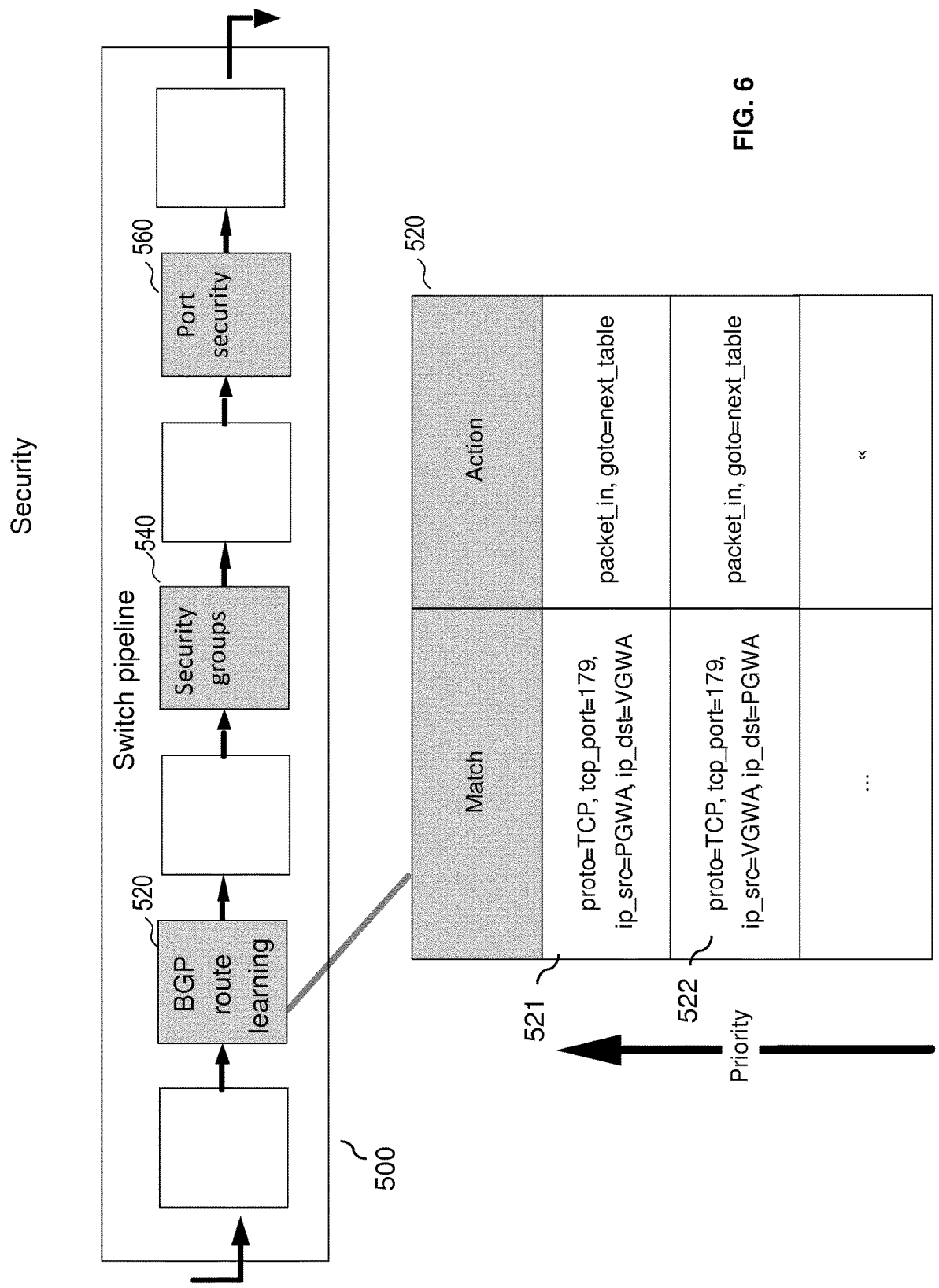
FIG. 6 shows a more detailed view of an Open Flow pipeline used in the virtual switch to inform the flow control entity about changed routes.

FIG. 6 below illustrates one of the possible realizations of the OpenFlow pipeline 500 for the invention.

On the topmost part of the figure, the pipeline 500 is represented as a set of boxes 510, 520, 540, 560 chained by arrows. Each box represents a table in the pipeline. The order of the tables' processing is from left to right. The switch 50 processes individual packets across the pipeline beginning with the arrow packet enters switch). There may be tables used to implement network applications and services not related to the invention scattered across the pipeline: such tables are depicted as white boxes. Tables relevant to the invention are depicted as light gray boxes 520, 540, 560. Finally, packets terminate the pipeline processing after the last table of the pipeline as represented by the arrow-packet leaves switch).

FIG. 6 shows the BGP route learning table, FIG. 7 the security groups table, and FIG. 8 the port security table.

Depending on the implementation, the order of these tables may vary. Some tables may be collapsed together with other tables. OpenFlow uses numbers to refer to tables, instead of names. Names are used for readability.

The BGP route learning table 520 of FIG. 6 is used to capture the BGP traffic and send a copy of each packet to the SDN controller for processing, and forward it to the next table. To capture the BGP traffic running between two BGP peers, such as PGWA and VGWA, two entries need to be inserted. The first flow entry 521 has a Match section comprising of:

Protocol equal to TCP
Port number equal to 179 (which is the IANA-defined port for BGP protocol). Note that if BGP is run over non-standard ports, this number should be provisioned by the SDN controller accordingly.
Source IP address equal to PGWA BGP peering IP addresses
Destination IP address equal to VGWA BGP peering IP addresses The second flow entry 522 has a Match section comprising:

Protocol equal to TCP
Port number equal to 179 (which is the IANA-defined port for BGP protocol). Note that if BGP is run over non-standard ports, this number should be provisioned by the SDN controller accordingly.
Source IP address equal to VGWA BGP peering IP addresses
Destination IP address equal to PGWA BGP peering IP addresses The Source and Destination IP addresses of both flow entries may belong to a data plane network, if using in-band BGP peering, or may belong to a control plane network, if using out-of-band BGP peering. This fact is known by the SDN controller as such information was provided by the OS in step S56 of FIG. 4, so the SDN controller can set the correct values for said IP addresses.

The Actions associated to both flow entries are set to Packet_In, which means that the SDN switch must send a copy of the packet to the SDN controller; and Goto: Next table, which instructs the SDN switch to continue the pipeline processing for the packet on next table.

There is no default action for this table (a rule with a Match of ANY) meaning that unmatched packets must continue processing on the next table of the pipeline, as per OpenFlow standard.

The SDN controller 100 processes the Packet in as per the method further illustrated in section "BGP processing in controller" discussed below.

Referring to FIG. 7, the Security groups table 540 is an example of one of the possible realization of the security groups functionality by an SDN controller.

To enforce security groups behavior for traffic between PGWA 30 and VGWA 40, it is required to insert flow entries for all the possible combinations of network routes accessible from each of the gateway's interfaces.

In the case of VGWA 40, which has two network interfaces, VGWA_NWA and VGWA_NWB, provided that it receives 3 routes from PGWA from Network A, and it has a single route to the Network B subnet, the number of combinations is (3*1)+(3*1)=6.

For each combination, two flow entries are inserted, to match traffic on each direction. The first flow entry 541 has a Match condition of:

Openflow port, that is, the virtual port the packets come in from, equal to the port that the gateway's network interface is connected to (VGWA_NWA or VGWA_NWB).
Direction of the traffic, set to ingress, matching traffic received at the interface.
Source IP addresses, equal to the IP address corresponding to the network that VGWA receives traffic from
Destination IP address, equal to the IP address corresponding to the network that VGWA sends traffic to.

The second flow entry 542 has a Match condition of:

Openflow port, that is, the virtual port the packets come in from, equal to the port that the gateway's network interface is connected to (VGWA_NWA or VGWA_NWB).
Direction of the traffic, set to egress, matching traffic sent from the interface.
Source IP addresses, equal to the IP address corresponding to the network that VGWA receives traffic to
Destination IP address, equal to the IP address corresponding to the network that VGWA sends traffic to.

The IP addresses are written in CIDR form, that is consisting of an IP address and a netmask.

The Action associated to those entries is set to Goto: Next table, which instructs the SDN switch 50 to continue the pipeline processing for the packet on next table, effectively allowing traffic to go through the security group screening.

Finally, a default flow entry (a rule with a Match of ANY) with an Action set to Drop makes the traffic not matched to the security group definitions to be dropped.

Referring to FIG. 8, the Port security table 560 is an example of one of the possible realization of the port security functionality by an SDN controller.

To enforce port security for traffic on each of the gateways' network interfaces PGWA and VGWA, it is required to insert flow entries for all the routes learnt by the gateway on each of the gateway's interfaces.

The number of flow entries to insert is a combination calculated on a per-interface basis. For each interface, there are as many combinations as networks reachable towards the other interfaces of the gateway.

In the case of VGWA, which has two network interfaces, VGWA_NWA and VGWA_NWB, provided that it receives 3 routes from PGWA from Network A, and it has a single route to the Network B subnet, there are 4 possible combinations (1 on interface VGWA_NWA, and 3 on interface VGWA_NWB).

For each combination, two flow entries are inserted, to match traffic on each direction.

The second flow entry 562, considering egress direction from the virtual gateway's point of view, has a Match condition of:

Openflow port, that is, the virtual port the packets are sent from, equal to the port that the gateway's network interface is connected to
Source MAC equal to the MAC address of the virtual port the packets are sent from
Source IP address equal to the IP address (CIDR, address and netmask) corresponding to the route learnt from another gateway or exported by the gateway by BGP The first flow entry 561, considering ingress direction from the virtual gateway's point of view, has a Match condition of:

Openflow port, that is, the virtual port the packets come in from, equal to the port that the gateway's network interface is connected to Destination MAC equal to the MAC address of the virtual port the packets come in Destination IP address equal to the IP address (CIDR, address and netmask) corresponding to the route learnt from another gateway or exported by the gateway by BGP For both flow entries, the Action is set to Goto: Next table, which instructs the SDN switch to continue the pipeline processing for the packet on next table, effectively allowing traffic to go through the port security screening.

Finally, a default flow entry (a rule with a Match of ANY) with an Action set to Drop makes the traffic not matched to the port security definitions to be dropped.

BGP Processing in Controller

BGP traffic exchanged between PGWA 30 and VGWA 40 is captured by the vswitch 50 and the corresponding data packets are sent to the SDN controller 100 for processing. The processing of BGP messages is described in this section, and corresponds to step S74 in FIG. 5.

Figure 9:
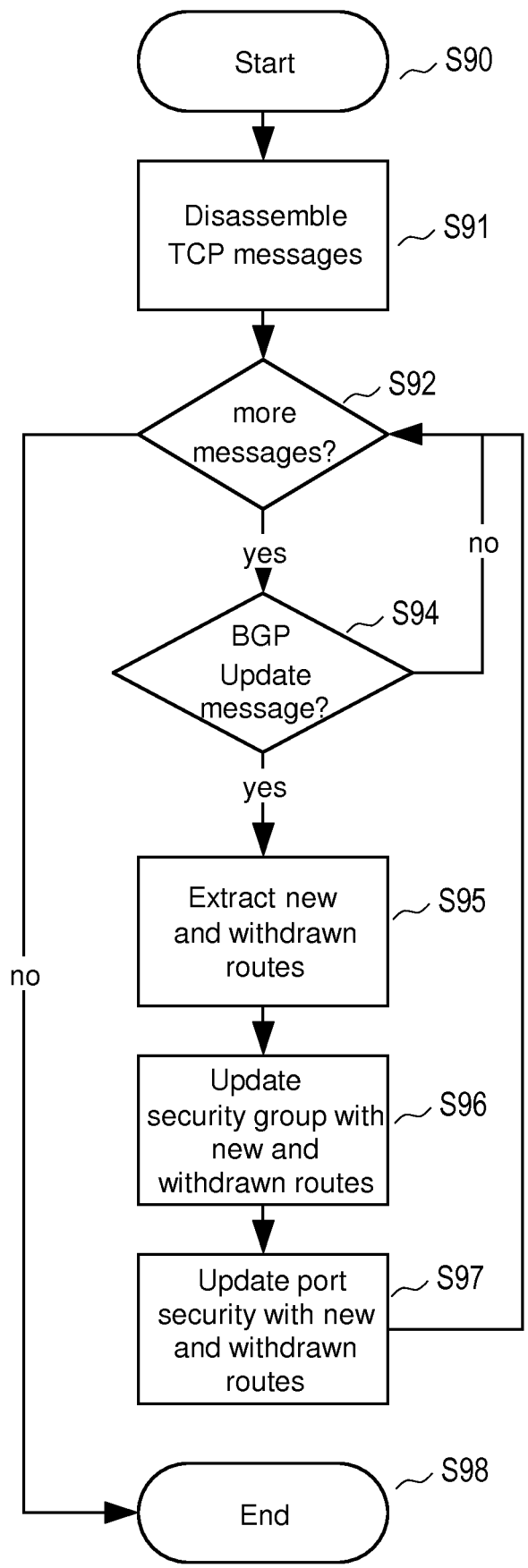
FIG. 9 shows an example flowchart of a method carried out in a flow control entity in a method as discussed in connection with FIG. 5.

FIG. 9 shows an activity diagram for handling the BGP packets in the SDN controller.

The process starts when a Packet in Openflow message is received in the SDN controller, as per step S72 in FIG. 5 (step S90).

The SDN Controller processes the packet and extracts BGP messages from it (S91).

Note that it may need to merge previously received packets in order to reassemble incomplete messages.

The SDN Controller processes BGP messages one by one (S92). BGP messages other than Update are not processed and discarded (S94).

For each BGP update message, the SDN controller extracts new and withdrawn routes (S95).

When using out-of-band BGP peering, the SDN controller needs to determine which data plane network interfaces the new and withdrawn routes refer to. The SDN controller can derive such information form the configuration provisioned by the OS in step S56 of FIG. 4. As the assumption is that both gateways are required to be directly connected, so there is no ambiguity in which interface of the gateway receiving the announcement shall be used for routing traffic towards the network received via BGP: it is always the one that directly connects the gateways. This is true regardless of the internal routing protocols that may run within the AS of the gateway receiving the route announcements.

The SDN controller invokes (S96) the Update security group rules method on the VIM to:

remove security group rules pertaining to withdrawn routes.

create new security group rules for new routes learnt.

This corresponds to step S75 in FIG. 5. The security group to use is looked up in the internal provisioning of the SDN controller, which was learnt during the provisioning of the gateway and BGP peering.

The SDN controller invokes (S97) the Update port security method on the VIM to:

remove allowed address pairs definitions pertaining to withdrawn routes.

create new allowed address pairs definitions for new routes learnt.

This corresponds to step S76 in FIG. 5. The virtual network interface or port to set the port security to is looked up in the internal provisioning of the SDN controller, which was learnt during the provisioning of the gateway and BGP peering.

The process completes (S98) when all the BGP Update messages available are processed.

OpenFlow Pipeline Update in Controller

Figure 10:
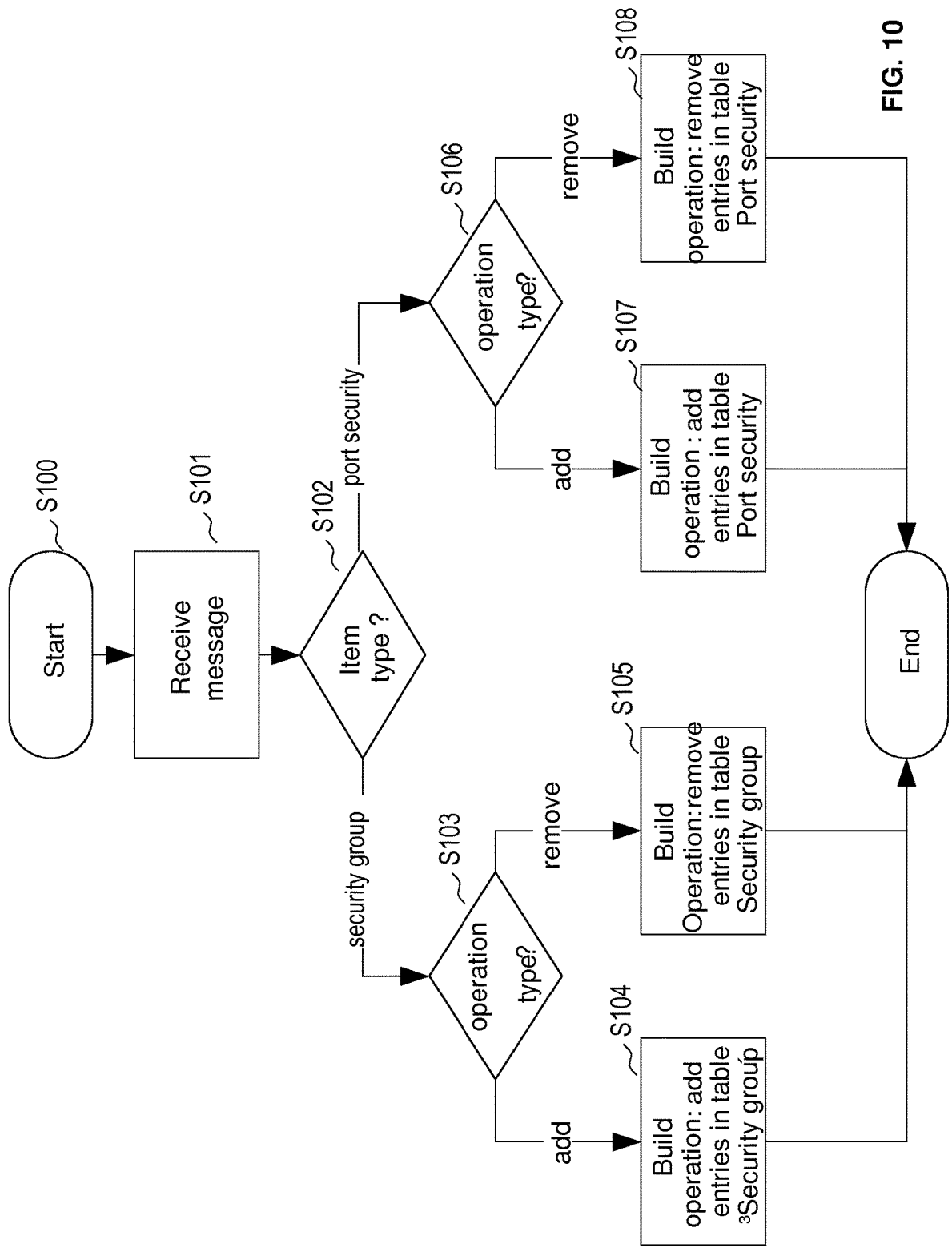
FIG. 10 shows a message flow showing the steps when a flow controller implements security group and port security rules in the virtual switch.

FIG. 10 illustrates one of the possible process that an SDN controller may implement to implement the security group and port security enforcement. It is not considered to be novel, but is described here for better understanding of the invention. This corresponds to step S78 in FIG. 5.

The process starts in step S100 and with the reception of a Security group update or a Port security update message in the SDN controller (S101).

Then the SDN controller determines the item the message operates on, either Security group or Port security (S102) and the type of the operation requested in the message, either Add (Update) or Remove (S103 and S106).

For adding security group rules (S104), the SDN controller creates flow entries in table "Security groups" 540 to enable the traffic coming from/to the newly learnt routes across the gateways.

For removing security group rules (S105), the SDN controller deletes flow entries in table "Security groups" 540 to no longer allow the traffic coming from/to the withdrawn routes across the gateways.

For adding port security rules (S107), the SDN controller creates flow entries in table "Port security" 560 to enable the traffic coming from/to the newly learnt routes across the gateways.

For removing port security rules (S108), the SDN controller deletes flow entries in table "Port security" 560 to no longer enable the traffic coming from/to the withdrawn routes across the gateways.

The SDN controller creates the new flow entries, and identifies the flow entries to remove, according to the method described previously in the Section "OpenFlow pipeline".

Figure 11:
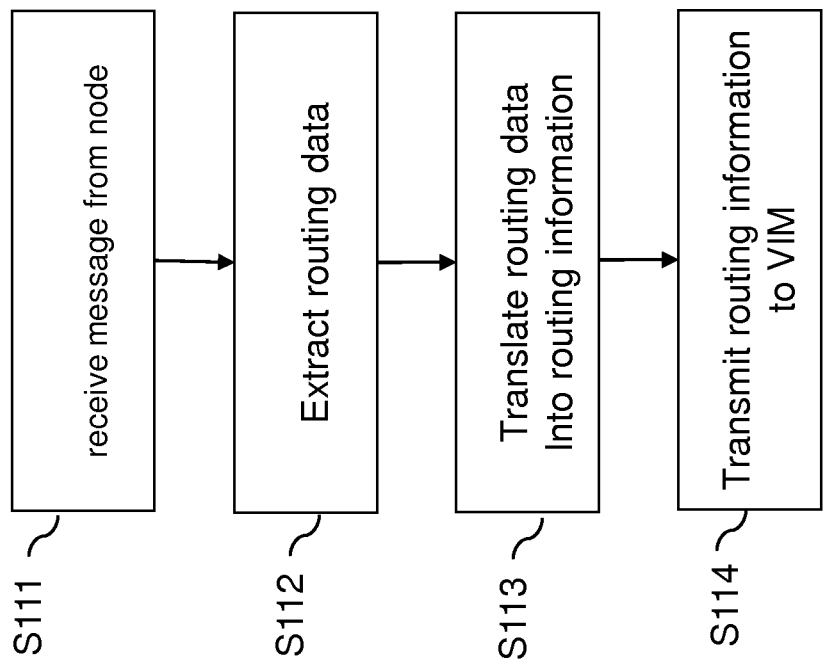
FIG. 11 shows an example flowchart of a method carried out by the flow control entity to collect routing information about new routes and withdrawn routes.

FIG. 11 summarizes some of the main steps carried out by the SDN controller or flow control entity 100 in order to make sure that the Gateway has up to date routing information. In step S111 a message is received from the node or virtual switch 50 located in the interconnection between the virtualized gateway 40 and the physical gateway 30. It is noted that the physical gateway may also be a virtualized gateway. The two gateways are exchanging the routing data by which each gateway informs the other gateway about new routes and withdrawn routes for the data packet flows. In step S112 the flow control entity extracts the routing data from the received messages wherein the extracted information comprises information about the new routes and the withdrawn routes. In step S113 the extracted routing data are translated into routing information, by way of example in requests requesting updated security group rules and updated port security settings. In step S114 the translated information, the routing information is then transmitted to the infrastructure managing entity of the virtualized part.

Figure 12:
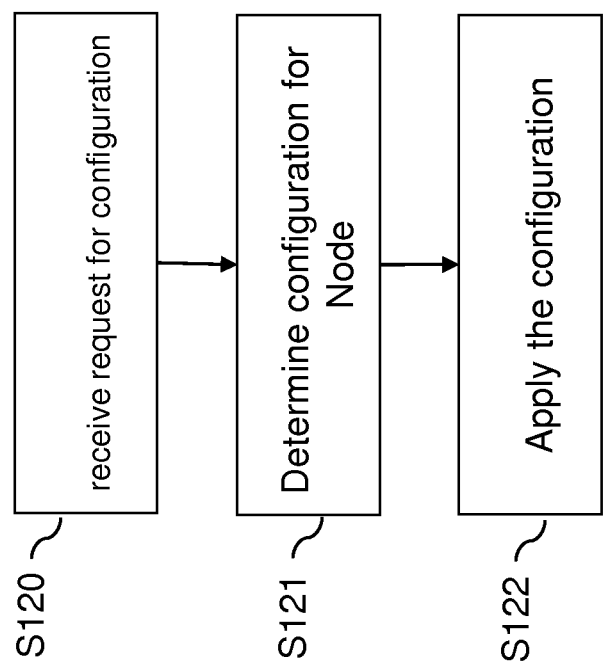
FIG. 12 shows an example flowchart comprising the steps carried out at a flow control entity when configuring a node located in the interconnection such that the node collects the routing data and transmits a copy to the flow control entity.

FIG. 12 summarizes the steps when the flow control entity configures the virtual switch to copy the messages comprising routing data to the flow control entity. Thus, with the steps of FIG. 12 the flow control entity assures that it receives the message as indicated in step S111 of FIG. 11. In step S120, the flow control entity receives the request for a configuration of the virtual switch which is located in the interconnection between the gateways where routing data is exchanged. This request can be received from the orchestration system 90. In step S121 it determines the configuration of the virtual switch located in the interconnection between the gateways in such a way that this switch is configured to identify the messages including the routing data exchanged between the gateways and to transmit a copy of the message including the routing data to the flow control entity. As mentioned in connection with FIG. 6 the configuration of the route learning table may be determined in this step. In step S122 the configuration such as the configuration of the route learning table 520 as show in FIG. 6 is then applied to the switch 50.

Figure 13:
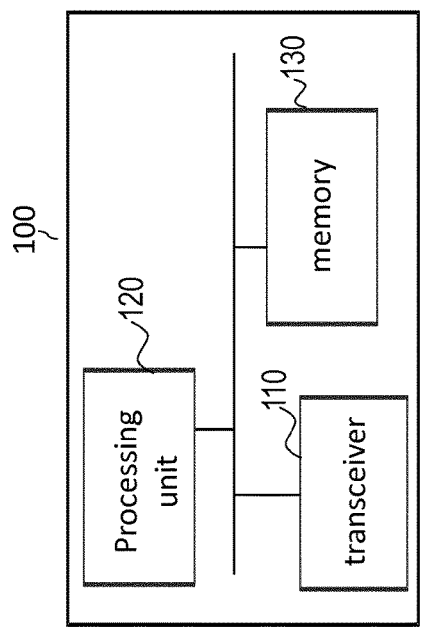
FIG. 13 shows an example schematic representation of a flow control entity configured to operate such that a virtualized gateway is informed about new routes or withdrawn routes.

FIG. 13 shows a schematic architectural view of a flow control entity 100 which can carry out the above discussed steps in which the flow control entity is involved. The flow control entity 100 comprises an interface 110 which is provided for transmitting user data or control messages, especially control messages to other entities such as the flow switching entities controlled by the flow control entity 100. The interface 110 furthermore symbolizes the capability of receiving user data or control messages from other entities. The flow control entity furthermore comprises a processing unit 120 which contains one or more processors and can carry out the instructions stored on a memory 130, wherein the memory may include a read-only memory, a random access memory, a mask storage, a hard disk or the like. The memory can furthermore include suitable program codes to be executed by the processing unit 120 so as to implement the above described functionalities in which the flow control entity 100 is involved.

Figure 14:
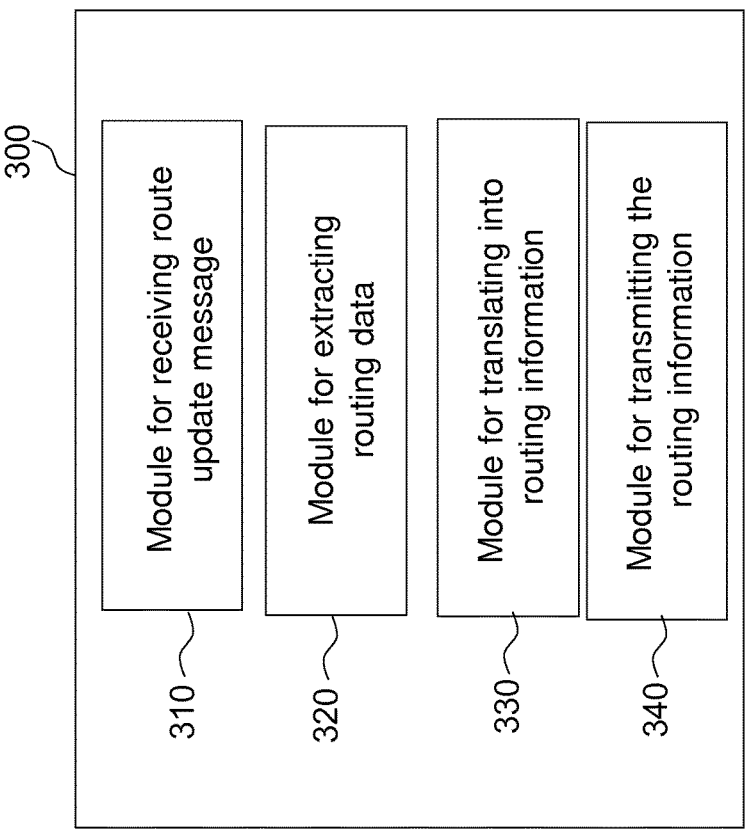
FIG. 14 shows another example schematic representation of a flow control entity as shown in FIG. 13.

FIG. 14 shows another embodiment of flow control entity 300 which comprises a first module 310 which is configured for receiving the message from the switch 50 and which includes the routing data. The flow control entity comprises a module 320 to extract the routing data from the received message which contain the information about the new routes and to the withdrawn routes. A module 330 is provided for translating the extracted routing data into the routing information such as a request for updated security group rules or port security settings. Furthermore, a module 340 is provided for transmitting the translated routing information to the virtualized infrastructure managing entity 80.

From the above said some general conclusions can be drawn.

As far as to flow control entity 100 is concerned it extracts the routing data only from the received message when the received message is a route update message informing the other gateway about changed routes, i.e., new routes or withdrawn routes, for the data packet flows.

In the example above the messages exchanged between the gateways for exchanging routing data are based on the border gateway protocol, BGP. However, other protocols may be used.

When the flow control entity 100 receives several of these update messages, the messages are processed one by one in order to extract the routing data, wherein the new routes and the withdrawn routes are extracted from each of the update messages separately.

For the translation of the routing data into the routing information the routing information can be translated into update request messages sent to the infrastructure managing entity in which an update of the security group rules is requested which are used for controlling a type of traffic transmitted or received by the at least one of the virtualized gateway.

The request for the update of the security group rules can include the step of removing security group rules pertaining to the withdrawn routes and can include to request to create new security group rules for new routes.

The translation of the routing data into routing information can furthermore include the step of translating the routing information into an update request to the infrastructure managing entity in which an update of the port security settings is requested, which is used for controlling data packet flows through the ports of the virtualized gateway. This requesting of the update of the port security setting can mean that it is requested to remove address pairs pertaining to the withdrawn routes and requesting to create new allowed address pairs for new routes.

When the routing data is exchanged out of band the flow control entity can furthermore determine the data plane network interfaces for the new routes and that the withdrawn routes.

Furthermore, the flow control entity 100 can receive a request for a configuration of the switch 50 located in the interconnection used by the virtualized gateway 40 and the at least one other gateway 30 to exchange the routing data. Furthermore, the configuration of the switch 50 is determined such that the switch identifies the routing data exchanged between the gateways. Furthermore, the configuration is applied to the switch 50.

As discussed above in connection with FIGS. 6 to 8, determining a configuration can mean that route learning table of an OpenFlow pipeline is populated with OpenFlow commands such that the switch identifies the messages comprising the routing data and such that then the switch transmits a copy of the message comprising the routing data to the flow control entity.

The above discussed invention enables the deployment of packet gateways in a cloud datacenter in compliance with the cloud security policy defined by an operator or service provider operating the cloud datacenter.

This enables the operator or service provider to have fine-grained access control lists for the network interfaces of the gateways instead of deploying loose access control lists or disabling them at all on these interfaces which would create security threats to the whole cloud datacenter. The mechanism does not impose new requirements on the gateways which means that it can be seamlessly deployed regardless of the used gateway. As it is a fully automated mechanism it continuously updates the security policy with the route data. This simplifies the operation of the gateways and reduces manual intervention and minimizes failures due to erroneous configuration so that in total the service provider can save cost.

The invention claimed is:

1. A method for operating a flow control entity which is configured to control a data packet flow in a network in which at least one virtualized gateway and at least one other gateway exchange routing data, the method comprising:

receiving a message from a node located in an interconnection used by the at least one virtualized gateway and the at least one other gateway to exchange routing data by which one of the gateways informs the other of the gateways about new routes and withdrawn routes for data packet flows which traverse the at least one virtualized gateway and the at least one other gateway;

extracting the routing data from the received message, extracted information comprising at least information about the new routes and withdrawn routes traversing the at least one virtualized gateway or the at least one other gateway;

translating the extracted routing data into routing information used to control the data packet flows at the at least one virtualized gateway; and transmitting the routing information to an infrastructure managing entity configured to manage a virtualized infrastructure of the network, wherein the routing data is only extracted from the received message, when the received message is a route update message informing the other gateway about changed routes for the data packet flows.

2. The method according to claim 1, wherein the received message is a message in accordance with a Border Gateway Protocol, BGP.

3. The method according to claim 1, wherein update messages are processed one by one in order to extract the routing data, wherein the new routes and the withdrawn routes are extracted from each of the update messages separately.

4. The method according to claim 1, wherein translating the routing data into routing information comprises translating the routing information into an update request to the infrastructure managing entity and requesting an update of security group rules used for controlling a type of traffic transmitted or received by the at least one virtualized gateway.

5. The method according to claim 4, wherein requesting an update of the security group rules comprises at least one of requesting to remove security group rules pertaining to withdrawn routes and requesting to create new security group rules for new routes.

6. The method according to claim 1, wherein translating the routing data into routing information comprises translating the routing information into an update request to the infrastructure managing entity requesting an update of a port security setting used for controlling data packet flows through ports of the at least one virtualized gateway.

7. The method according to claim 6, wherein requesting an update of a port security setting comprises at least one of requesting to remove address pairs pertaining to withdraw routes and requesting to create new allowed address pairs for new routes.

8. The method according to claim 1, further comprising determining data plane network interfaces for the new routes and the withdrawn routes when the routing data is exchanged out of band.

9. The method according to claim 1, further comprising the steps of:
receiving a request for a configuration of the node located in the interconnection used by the at least one virtualized gateway and the at least one other gateway to exchange the routing data;
determining a configuration of the node located in the interconnection such that the node is configured to identify the routing data between the at least one virtualized gateway and the at least one other gateway; and
applying the configuration to the node located in the interconnection.

10. The method according to claim 9, wherein applying the configuration comprises configuring the node such that the node carries out the following steps:
checking whether the received message comprises the routing data informing the other gateway about changed routes of the data packet flows; and
in the affirmative, transmitting a copy of the received message to the flow control entity.

11. The method according to claim 9, wherein determining a configuration comprises populating a route learning table of an OpenFlow pipeline with OpenFlow commands such that the node identifies messages comprising the routing data and transmits a copy of the messages comprising routing data to the flow control entity.

12. A computer program product comprising a non-transitory computer readable storage medium storing a computer program comprising program code to be executed by at least one processor of a flow control entity, wherein execution of the program code causes the at least one processor to execute a method according to claim 1.

13. A method for operating a flow control entity which is configured to control a data packet flow in a network in which at least one virtualized gateway and at least one other gateway exchange routing data by which one of the gateways informs the other of the gateways about new routes and withdrawn routes for data packet flows which traverse the at least one virtualized gateway and the at least one other gateway, the method comprising:
receiving a request for a configuration of a node located in an interconnection used by the at least one virtualized gateway and the at least one other gateway to exchange the routing data;
determining a configuration of the node located in the interconnection such that the node is configured to identify messages including the routing data exchanged between the at least one virtualized gateway and the at least one other gateway and to transmit a copy of the message including the routing data to the flow control entity; and
applying the configuration at the node located in the interconnection,
wherein determining a configuration comprises populating a route learning table of an OpenFlow pipeline with OpenFlow commands such that the node identifies the routing data and transmits a copy of the routing data to the flow control entity.

14. A flow control entity comprising a memory and at least one processing unit, the memory comprising instructions executable by said at least one processing unit, wherein the flow control entity controls a data packet flow in a network, in which at least one virtualized gateway and at least one other gateway exchange routing data and is operative to:
receive a message from a node located in an interconnection used by the at least one virtualized gateway and the at least one other gateway to exchange routing data by which one of the gateways informs the other of the gateways about new routes and withdrawn routes for data packet flows which traverse the at least one virtualized gateway or the at least one other gateway;
extract the routing data from the received message, extracted information comprising at least information about the new routes and withdrawn routes traversing the at least one virtualized gateway or the at least one other gateway;
translate the extracted routing data into routing information used to control the data packet flows at the at least one virtualized gateway; and
transmit the routing information to an infrastructure managing entity configured to manage a virtualized infrastructure of the network.

15. The flow control entity according to claim 14, further being operative to only extract the routing data from the received message, when the received message is a route update message informing the other gateway about changed routes for the data packet flows.

16. The flow control entity according to claim 14, further being operative to process update messages one by one in order to extract the routing data, and to extract the new routes and the withdrawn routes from each of the update messages separately.

17. The flow control entity according to claim 14, further being operative, for translating the routing data into routing information, to translate the routing information into an update request to the infrastructure managing entity requesting an update of security group rules used for controlling a type of traffic transmitted or received by the at least one virtualized gateway.

18. The flow control entity according to claim 17, further being operative, for requesting an update of the security group rules, to request at least one of removing security group rules pertaining to withdrawn routes and creating new security group rules for new routes.

\* \* \* \* \*